United States Patent [19]

Leach et al.

[11] Patent Number: 4,550,283
[45] Date of Patent: Oct. 29, 1985

[54] UNIPOLAR ROTATIONAL SPEED TRANSDUCER

[75] Inventors: Robert L. Leach, Hawthorne; Richard L. Wickens, Franklin Lakes, both of N.J.

[73] Assignee: Servo-Tek Products Company, Hawthorne, N.J.

[21] Appl. No.: 519,971

[22] Filed: Aug. 3, 1983

[51] Int. Cl.$^4$ .................. H02K 17/42; H02K 1/22
[52] U.S. Cl. ............................... 322/48; 310/178; 310/266
[58] Field of Search .............. 322/31, 48; 310/178, 310/266; 324/160

[56] References Cited

U.S. PATENT DOCUMENTS

| | | | |
|---|---|---|---|
| 2,519,365 | 8/1950 | Goertz | 171/252 |
| 2,588,466 | 3/1952 | Barnes | 310/178 |
| 2,759,116 | 8/1956 | Glass | 310/171 |
| 2,896,101 | 7/1959 | Laskin | 310/171 |
| 3,001,117 | 9/1961 | Silcorra | 318/448 |
| 3,185,877 | 5/1965 | Sears | 310/115 |
| 3,229,133 | 1/1966 | Sears | 310/178 |
| 3,248,584 | 4/1966 | Knauer | 310/266 |
| 3,525,005 | 8/1970 | Beyers | 310/156 |
| 3,529,191 | 9/1970 | Bavdot | 310/178 |
| 3,549,924 | 12/1970 | Klein | 310/168 |
| 3,586,894 | 6/1971 | Mueller | 310/178 |
| 3,636,392 | 1/1972 | Gerry | 310/67 |
| 3,641,376 | 2/1972 | Livingston | 310/113 |
| 3,699,370 | 10/1972 | Caldwell | 310/178 |
| 3,809,936 | 5/1974 | Klein | 310/171 |
| 3,848,157 | 11/1974 | kripl | 317/5 |
| 3,886,385 | 3/1975 | Bacchialoni | 310/178 X |
| 4,051,402 | 9/1977 | Gruber | 310/266 |
| 4,082,970 | 4/1978 | Givardin | 310/113 |
| 4,221,985 | 9/1980 | Larson et al. | 310/171 |
| 4,237,394 | 12/1980 | Aoki | 310/113 |
| 4,297,604 | 10/1981 | Tawse | 310/168 |
| 4,349,761 | 9/1982 | Aoki | 310/266 |
| 4,366,405 | 12/1982 | Schmider | 310/268 |
| 4,388,547 | 6/1983 | Gruber | 310/266 |

FOREIGN PATENT DOCUMENTS 46860 4/1980 Japan.
2056073 3/1981 United Kingdom.
743125 6/1980 U.S.S.R..

OTHER PUBLICATIONS

1969 Hewlett-Packard Catalog-"Electronics for Measurement-Analysis-Computation".

Primary Examiner—R. J. Hickey
Attorney, Agent, or Firm—Body, Vickers & Daniels

[57] ABSTRACT

Minaturized unipolar low power rotational speed transducers or tachometer generators are disclosed, one of which is comprised of coaxial housing and pole members of magnetic material and a permanent magnet interposed therebetween and which housing and pole member provide an annular air gap receiving the annular side wall of a rotatable cup-shaped rotor of electrically conductive material. The rotor is supported by a drivable shaft at the end of the housing corresponding to the closed end of the rotor, and a pair of brushes radially engage the rotor side wall adjacent the closed and open ends of the rotor to provide an output signal in response to driving rotation of the rotor. In a second embodiment, the inner side of one end wall of an axially narrow housing of magnetic material is provided with an annular permanent magnet disc providing a narrow air gap with the inner side of the other end wall of the housing, and a thin disc of electrically conductive material is mounted on a drive shaft supported by the end walls for the disc to be rotatable in the air gap. The rotor disc has radially inner and outer portions respectively extending radially inwardly and outwardly of the radially inner and outer extremities of the permanent magnet disc, and a pair of brushes are supported by the housing to axially engage the rotor disc along the inner and outer portions thereof. The tachometer generators are low inertia devices, have no windings and are further characterized by a low current and voltage requiring the use of an amplifier, and a ripple free output signal maximizing signal to noise ratio.

29 Claims, 7 Drawing Figures

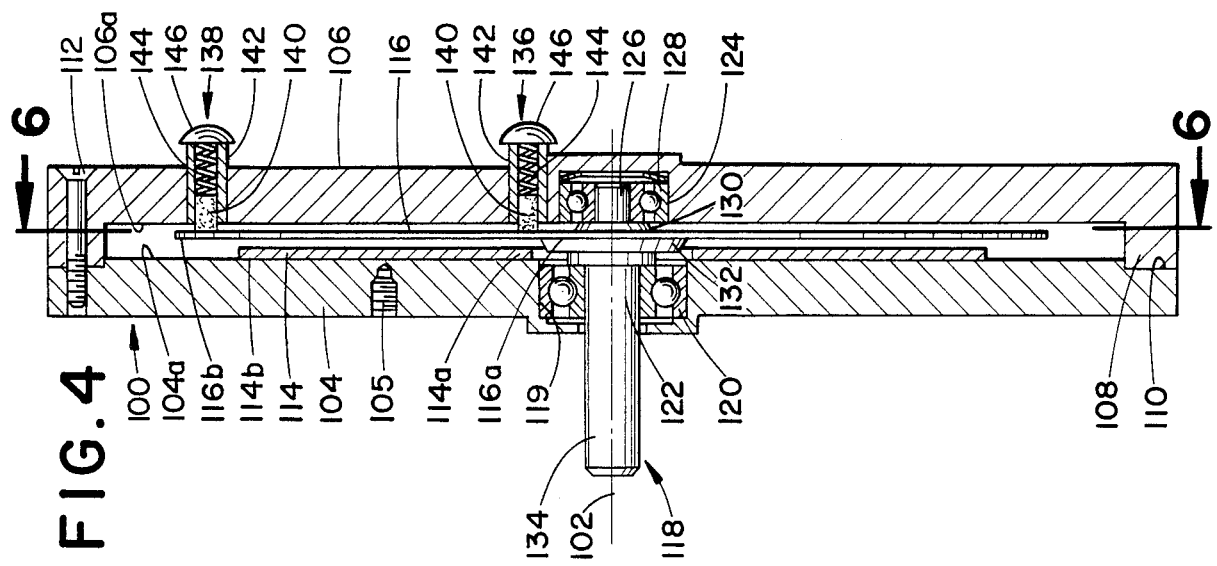

UNIPOLAR ROTATIONAL SPEED TRANSDUCER

BACKGROUND OF THE INVENTION

The present invention relates to the art of signal generators and, more particularly, to improvements in unipolar rotational speed transducers.

Unipolar or homopolar generators are of course well known in connection with the generating of electrical signals. In one form of such generators, a cylinder of conductive material such as copper is rotated about the axis of the cylinder and in a magnetic field which is radial with respect to the axis of rotation. A potential difference is generated axially of the cylinder in response to rotation of the cylinder in the magnetic field, whereby an output signal indicative of rotor speed can be obtained such as through the use of brush contacts at axially opposite ends of the cylinder. In another form, a disc of conductive material such as copper is rotated about an axis perpendicular to the plane of the disc and in a magnetic field which is parallel to the axis of rotation. Accordingly, a potential difference is generated radially of the rotor disc, whereby an output signal proportional to the speed of rotation of the disc can be obtained such as through brush contacts which are generally connected respectively to the rotor shaft and the radially outer periphery of the rotor disc.

The approach in connection with many signal generators heretofore provided has been to produce a device having a high voltage output signal. Such designs have been dimensionally large and structurally complex, resulting in a high inertia operation, and have required a considerable number of component parts which adds to the expense of the generators both from the standpoint of the number of parts and the assembly time required with respect thereto. In addition to such high voltage signal designs, efforts have been made to provide physically smaller signal generators, some of which designs have included the use of permanent magnets to provide the magnetic field. These designs generally have a low current output and, while promoting a smaller size than the high current designs, are not economical to produce and have not overcome the problems of structural complexity and an excessive number of component parts to be assembled and structurally interrelated with one another. Moreover, while promoting a smaller size, such designs still have a high inertia characteristic in proportion to the size thereof. Furthermore, both such high power and low power D.C. signal generators heretofore provided have included windings and commutating arrangements which produce a ripple in the output signals therefrom and a low signal to noise ratio, both of which are undesirable. Especially in connection with designs toward miniaturizing the physical size of such generators, the structures often require precision parts and extreme care in assembly in order to provide stability against undesirable relative displacements between the component parts of the character which affect efficiency of operation and uniformity with respect to the output signal. One problem in particular in connection with miniaturization of the unipolar generator is the positioning of the brush elements so as to optimize uniformity of the output voltage signal. More particularly in this respect, uniformity of the output signal is optimized by positioning the brush elements outside the magnetic field and, heretofore, the structural arrangements of the component parts of generator units would require enlargement rather than reduction of the overall unit size in order to achieve such positioning of the brush elements.

SUMMARY OF THE INVENTION

In accordance with the present invention, permanent magnet type unipolar tacometer generators are provided which are comprised of a minimum number of component parts devoid of any windings and structured and structurally interrelated so as to optimize minaturizing the overall unit size with respect to given sizes of the component parts while obtaining a low inertia device having a ripple free, low power output signal which requires amplification for use and which device is further characterized by a maximum signal to noise ratio. Moreover, the structures of and structural interrelationships between the component parts of unipolar signal generators in accordance with the present invention promote economy with respect to production of the units and, additionally, promote both efficiency of operation and quality with respect to the output signals of the generators.

The foregoing attributes are achieved in accordance with the invention by providing unique structural relationships between housing components, a permanent magnet and a rotor of electrically conductive material which enables producing a low power output signal without any windings and which is ripple free. Furthermore, the rotor component and rotational support thereof promote low inertia operation, and the ripple free character of the output signal results in a maximum signal to noise ratio. The output signal from tachometer generators constructed according to the invention is, for example, in the range of from about 6 to 18 millivolts/1000 rpm whereby amplification of the output signal is essential in connection with obtaining a usable signal.

As will become apparent hereinafter, tachometer generators of both the cup and disc type can be constructed to provide the foregoing attributes according to the invention. Additionally, the present invention enables both types of tachometer generators to be constructed for the brush elements to engage the corresponding rotor component outside the path of the magnetic field, thus to enhance uniformity with respect to the output signal.

It is accordingly an outstanding object of the present invention to provide unipolar direct current rotational speed transducers or tachometer generators of the character including a permanent magnet for generating a magnetic field and which are devoid of windings and commutator and operable to produce a low power D.C. output signal having a magnitude requiring amplification for practical use.

Another object is the provision of unipolar transducers or tachometers of the foregoing character comprised of a minimum number of component parts which are structured and structurally interrelated to provide for low inertia operation and optimum compactness of the signal generator unit.

Yet another object is the provision of unipolar transducers or tachometers of the foregoing character wherein the structure and structural interrelationship between the component parts thereof provide for the generation of a ripple free output signal and an operating stability which minimizes voltage variations in the generated output signal.

Still another object is the provision of unipolar transducers or tachometers of the foregoing character in which the structures and structural interrelationships between the component parts enables the positioning of brush elements outside the magnetic field, thus to minimize variations in voltage of the output signals while optimizing the overall size of the unit.

A further object is the provision of a unipolar transducer or tachometer comprised of a combination of housing and pole member portions of magnetic material, a permanent magnet, and a rotor of electrically conductive material and which component parts are structured and structurally interrelated to produce, without the use of windings and through the use of an amplifier, a usable ripple free output signal, and in which transducer or tachometer the component parts cooperate to promote low inertia and a maximum signal to noise ratio.

BRIEF DESCRIPTION OF THE DRAWINGS

The foregoing objects, and others, will in part be obvious and in part pointed out more fully hereinafter in conjunction with the written description of preferred embodiments illustrated in the accompanying drawings in which:

FIG. 3 is a cross-sectional elevation view of the generator taken along line 3—3 in FIG. 1;

FIG. 4 is a sectional side elevation view of another unipolar direct current tachometer generator constructed in accordance with the present invention and having a disc rotor;

DESCRIPTION OF THE PREFERRED EMBODIMENTS

Figure 1:
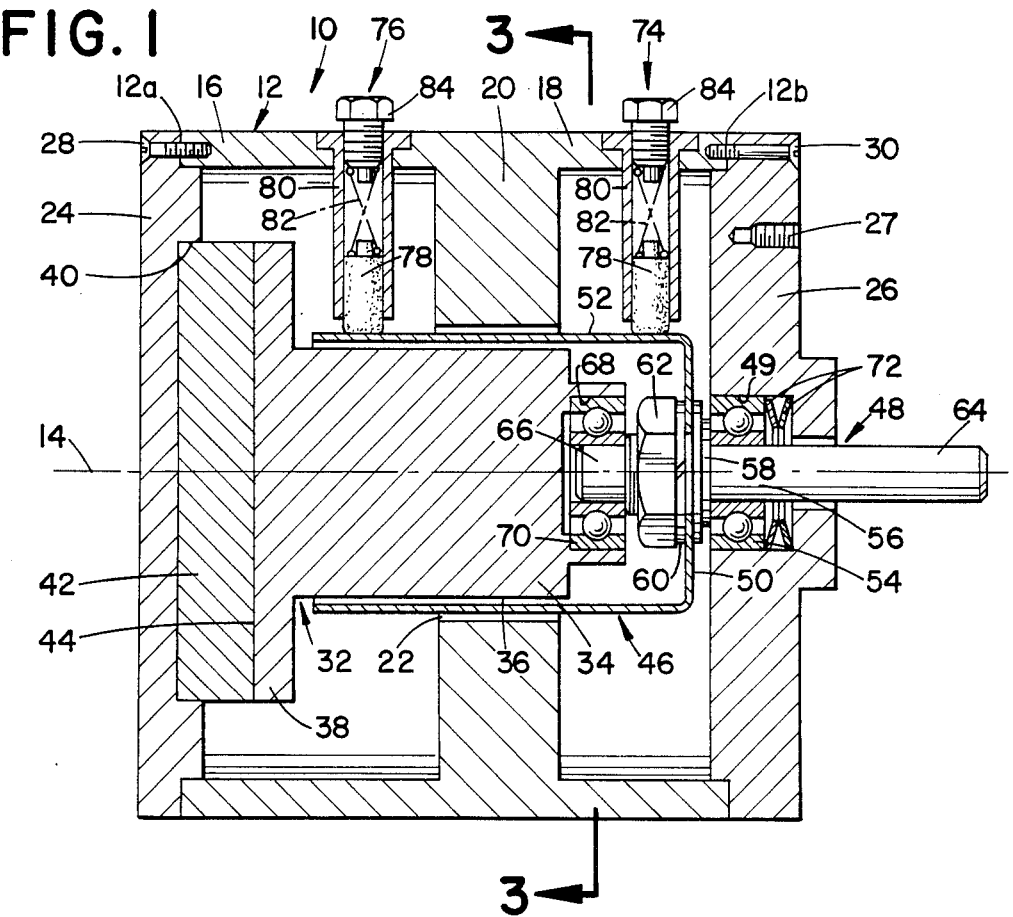
FIG. 1 is a sectional side elevation view of a unipolar direct current tachometer generator constructed in accordance with the present invention and having a cupshaped rotor.
Figure 2:
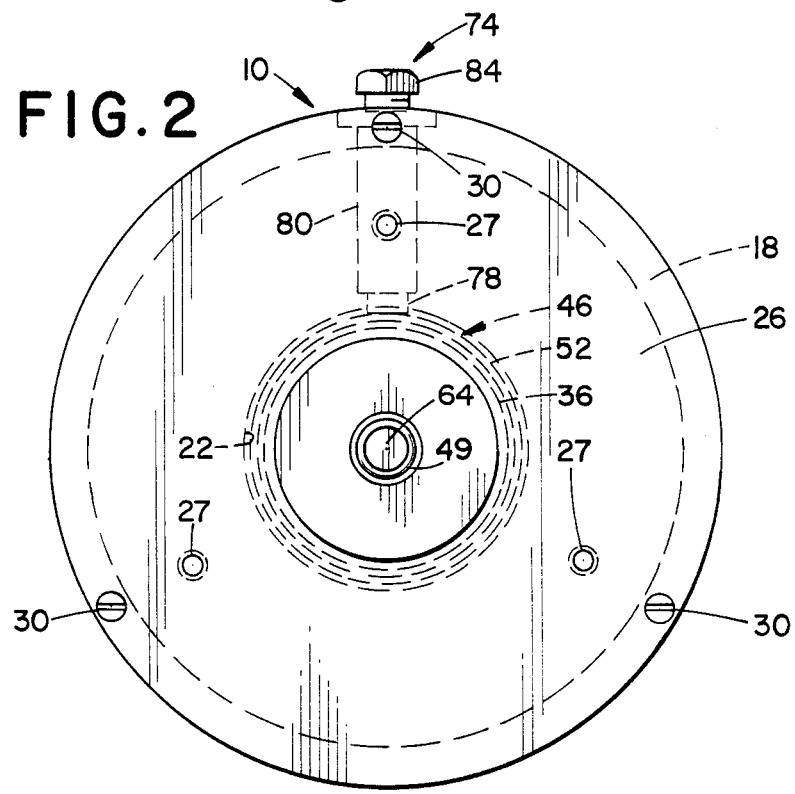
FIG. 2 is an end elevation view of the generator looking in the direction from right to left in FIG. 1.

With reference now in greater detail to the drawings wherein the showings are for the purpose of illustrating preferred embodiments of the invention only and not for the purpose of limiting the invention, FIGS. 1-3 of the drawing illustrate a unipolar direct current signal generator 10 including an enclosure defined in part by an annular housing 12 having an axis 14 and axially opposite ends 12a and 12b. Housing 12 is of suitable magnetic material such as iron and includes an annular wall portion 16 extending axially inwardly from end 12a thereof, an annular wall portion 18 extending axially inwardly from end 12b thereof, and an annular pole portion 20 integral with and generally centrally between wall portions 16 and 18 and extending radially inwardly therefrom to provide an annular opening 22. The enclosure further includes a first end wall 24 closing housing 12 at end 12a thereof and a second end wall 26 closing the housing at end 12b thereof. End wall 24 is a generally flat annular plate member of magnetic material such as iron removably fastened to wall portion 16 of housing 12, such as by means of a plurality of circumferentially spaced apart threaded fasteners 28, only one of which is visible in FIG. 1. End wall 26 is a generally flat annular plate of a suitable non-magnetic material such as aluminum and which is removably fastened to annular wall portion 18 such as by means of a plurality of threaded fasteners 30. Further, end wall 26 is provided with a plurality of circumferentially spaced apart internally threaded openings 27 which facilitate mounting the generator on a suitable support for use.

The generator unit further includes an annular pole member 32 of magnetic material such as iron having an annular inner portion 34 coaxial with axis 14 and having an outer surface 36 radially inwardly spaced from opening 22 of pole portion 20 of housing 12 to provide an annular air gap therewith. Pole member 32 further includes an annular outer end 38 in the form of a circumferential flange extending radially outwardly from outer surface 36. The inner side of end wall 24 is provided with an annular recess 40 having a diameter corresponding to that of flange 38 of pole member 32, and a permanent magnet 42 is seated in recess 40 and facially engages the axially outer end face 44 of pole member 32. Pole member 32 is supported in coaxial relationship with axis 14 by end wall 24 and magnet 42 and, preferably, such support is achieved by adhesively bonding magnet 42 in recess 40 and to end face 44 such as through the use of a suitable epoxy adhesive. While the latter is preferred, it will be appreciated that the end wall, magnet and pole member could be otherwise fastened together such as through the use of a fastener or fasteners extending through end wall 24 and magnet 42 and into pole member 32.

A cup-shaped rotor 46 of suitable electrically conductive material such as copper is supported in the enclosure defined by housing 12 and end walls 24 and 26 for rotation about axis 14 by means of a rotor shaft 48 of non-magnetic material. Rotor 46 includes an end wall 50 transverse to axis 14 and an annular side wall 52 extending axially from end wall 50 through the air gap between pole portion 20 and pole member 32 to a point axially adjacent flange 38 of pole member 32, whereby it will be appreciated that the rotor has a closed outer end adjacent end wall 26 and an open inner end adjacent flange 38 of the pole member. It will be further appreciated that the outer and inner ends of annular side wall portion 52 of the rotor are each axially spaced from the corresponding one of the axially opposite sides of pole portion 20 of housing 12.

As mentioned above, cup-shaped rotor 46 is rotatably supported by rotor shaft 48 and, in this respect, the rotor shaft extends through an opening 49 therefor in end wall 26 and is supported for rotation relative to end wall 26 by means of a ball bearing assembly 54 interposed between opening 49 and an intermediate portion 56 of the rotor shaft. Intermediate portion 56 of shaft 48 is provided with an integral radially enlarged collar 58, and end wall 50 of rotor 46 is apertured to be received on the axially inner end of shaft 48 and is secured thereto by means of washers 60 engaging axially opposite sides of end wall 50, and a nut 62 threadedly engaging a corresponding threaded portion on the inner end of shaft 48. The axially outer end 64 of shaft 48 provides for driving rotor 46, and the axially innermost end 66 of shaft 48 terminates in an axially extending recess 68 provided in inner end 34 of pole member 32. End 66 of the shaft is rotatably supported by the inner end of the pole member by the provision of a ball bearing unit 70 interposed between recess 68 and shaft portion 66.

Spring washers 72, or the like, axially interposed between ball bearing unit 54 and opening 49 in end wall 26, together with the support of shaft 48 through bearing units 54 and 70, provide stability for the cup-shaped rotor during rotation thereof against radial and axial displacement of the rotor relative to the air gap between pole portion 20 and inner end 34 of pole member 32.

It will be appreciated, of course, that rotation of outer end 64 of shaft 48 imparts corresponding rotation to rotor 46, whereby annular side wall 52 of the rotor rotates in the magnetic field generated by magnet 42 and the path of which field is axially through inner end 34 of pole member 32, radially across the air gap to pole portion 20 of housing 12, axially along annular wall portion 16 of the housing and then radially of end wall 24 back to magnet 42. Such rotation of rotor 46 generates a potential difference between the axially outer and inner ends of annular side wall 52 of the rotor, and such potential difference provides an output voltage signal across first and second brush units 74 and 76 respectively supported by annular wall portions 18 and 16. Each of the brush units 74 and 76 includes a brush element 78 slidably supported in a corresponding brush holder 80 suitably mounted on housing 12 for the axially inner ends of the brush elements to radially engage the outer surface of rotor wall 52 under the bias of a corresponding brush spring 82. Spring 82 is interposed between the axially outer end of the brush element and an adjustable member 84 threadedly interengaged with brush holder 80 for adjusting the biasing of the spring and thus the bias of the brush element against the rotor wall. It will be appreciated that members 84 provide suitable terminals for the output signal which is amplified for use by means of a signal amplifying circuit connected thereacross as set forth hereinafter. Advantageously in accordance with the present embodiment, the structure of housing 12 providing the generally centrally located pole portion 20, together with the structural arrangement of pole member 32 and magnet 42 and the support of the closed end of rotor 46 provides for brush elements 78 to engage wall 52 of the rotor axially outwardly of the magnetic field, thus to minimize variations in the output voltage acros terminal members 84 and which variation can be caused by the contact points of the brush elements being in the magnetic field. Moreover, the structure and structural interrelationship between the several component parts advantageously optimizes minaturization of the signal generating units.

For the purpose of illustrating the overall compactness achieved with respect to the embodiment described above, the structure of the component parts provides for the generating unit to have an axial length of about 2.178 inches between the outer sides of end walls 24 and 26 and an outer diameter of about 2.250 inches. Permanent magnet 42 has an axial thickness of about 0.250 inch and a diameter of about 1.50 inch. Further, inner portion 34 of pole member 32 has a diameter of about 0.802 inch and an axial length of about 1.125 inches, and rotor 46 has a wall thickness of about 0.020 inch, an inner diameter of about 0.875 inch and an axial length of about 1.187 inch. The axial width of pole portion 20 is about 0.375 inch.

Figure 5:
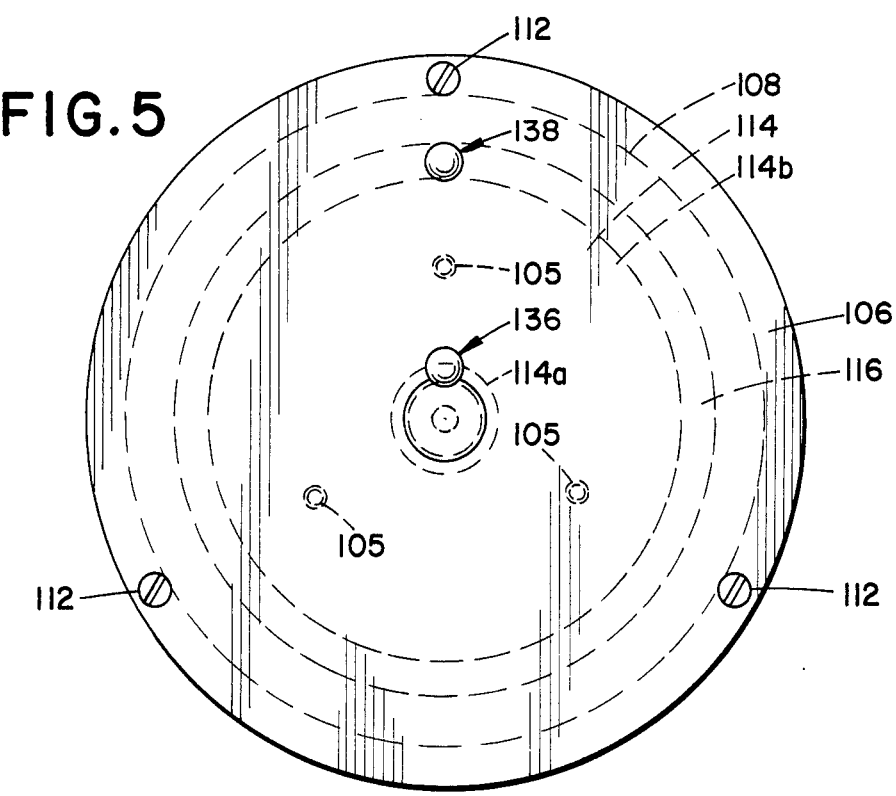
FIG. 5 is an end elevation view of the generator looking in the direction from right to left in FIG. 4.
Figure 6:
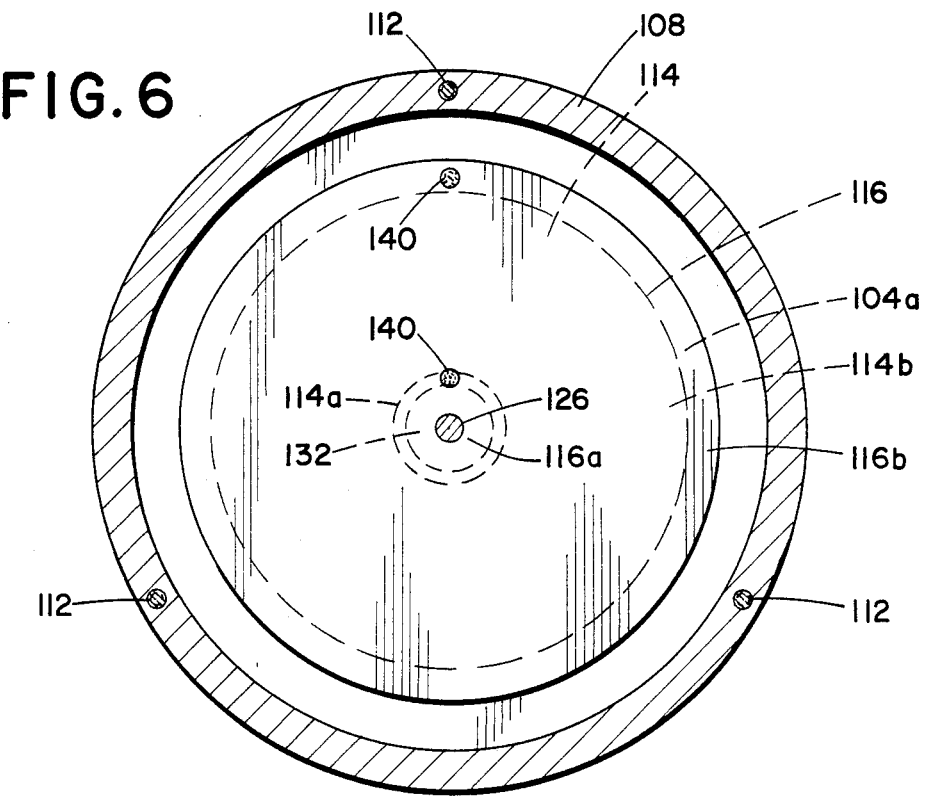
FIG. 6 is a cross-sectional view of the generator as seen along line 6—6 in FIG. 4; and, FIG. 7 is a schematic illustration of an amplifier circuit usable with the tachometer generators of FIGS. 1-6.

With reference now to FIGS. 4-6 of the drawing, there is illustrated another embodiment of a signal generator in accordance with the present invention. More particularly, a signal generator 100 according to this embodiment has an axis 102 and includes a housing or enclosure comprised of circular end walls 104 and 106 of magnetic material disposed in axially spaced apart parallel relationship transverse to axis 102. The enclosure further includes a circumferentially continuous annular portion 108 extending axially between end walls 104 and 106 and which, in the embodiment illustrated, is provided by an axially extending circumferential flange integral with end wall 106 and received in a corresponding annular recess 110 in end wall 104. A plurality of threaded fasteners 112 extend through end wall 106 and flange 108 and into threaded engagement with openings therefor in end wall 104, thus to releaseably interconnect the end walls and to maintain planar inner surfaces 104a and 106a thereof in closely axially spaced apart parallel relationship. End wall 104 is provided with a plurality of circumferentially spaced apart internally threaded openings 105 which facilitate mounting the signal generating unit on a suitable support for use.

Inner surface 104a of end wall 104 is provided with an axially thin annular permanent magnet disc 114 which is suitably secured to surface 104a such as by adhesive bonding and which permanent magnet disc includes radially inner and radially outer edge portions 114a and 114b, respectively. Disc 114 is coaxial with axis 102 and is parallel and spaced apart from inner surface 106a of end wall 106 to provide an air gap therewith. A rotor 116 in the form of a disc of electrically conductive material such as copper is supported in the enclosure for rotation in the air gap about axis 102. More particularly in this respect, a rotor drive shaft 118 of non-magnetic material extends into the enclosure through an opening 119 provided therefor in end wall 104 and is supported by wall 104 for rotation about axis 102 by means of a ball bearing unit 120 interposed between opening 119 and intermediate portion 122 of shaft 118. The inner side of end wall 106 is provided with a recess 124, and the axially inner end 126 of shaft 118 is supported for rotation relative to wall 106 by means of a ball bearing unit 128 interposed between recess 124 and shaft portion 126. An annular collar 130 is provided between shaft portions 122 and 126, and disc rotor 116 is received on shaft portion 122 and is engaged against collar 130 and fixed on the shaft for rotation therewith by means of a retaining member 132 suitably secured on the shaft. Outer end 134 of shaft 118 is adapted to be driven in connection with use of the signal generator to rotate disc rotor 116 relative to end walls 104 and 106 and permanent magnet 114.

It will be appreciated that permanent magnet 114 generates a magnetic field having a path across the air gap between end walls 104 and 106, radially outwardly through end wall 106, axially across flange 108, and radially inwardly through end wall 104 to magnet 114. Accordingly, upon rotation of disc rotor 116 a potential difference is generated between the axially inner and outer portions of the rotor disc, and this potential difference provides an output signal across inner and outer brush units 136 and 138, respectively. Each of the brush units includes a brush element 140 slidable in a corresponding brush support 142 mounted on end wall 106 for the inner end of the brush element to axially engage the corresponding side of disc rotor 116. Each of the brush units further includes a corresponding biasing spring 144 disposed between the axially outer end of the brush element and the inner side of a contact member 146 which, while somewhat schematically illustrated, provides for adjusting the biasing spring and provides a contact terminal for connection to an amplifying circuit as set forth hereinafter and by which the output signal is amplified to a usable level. Importantly in accordance with the present embodiment, and as will be best seen in FIG. 4, disc rotor 116 has radially inner and outer portions 116a and 116b, respectively, and which portions are engaged by the brush elements of inner and outer brush units 136 and 138, respectively. Furthermore, rotor portions 116a and 116b are respectively radially inwardly and radially outwardly of the radially inner and outer ends of magnet 114. This structure and structural interrelationship between the component parts of the signal generator advantageously enables the brush members of the brush units to engage the disc rotor 116 outside the magnetic field so as to minimize variations in the output signal.

As illustrative of the minaturization of a direct current signal generator constructed in accordance with the embodiment illustrated in FIGS. 4, 5 and 6, the generator unit has an outer diameter of about 3.375 inches and an axial length between the outer sides of end walls 104 and 106 of about 0.50 inch. Accordingly, it will be appreciated that the signal generator has a diameter several times the axial dimension thereof. Each of the end walls 104 and 106 is about 0.20 inch in axial thickness leaving about 0.10 inch between the axially opposed inner surfaces 104a and 106a of the end walls. It will be appreciated therefore that permanent magnet disc 114 has an axial thickness less than that of each of the plate members. The permanent magnet has an outer diameter of about 2.50 inches and an inner diameter of about 0.55 inch, and disc rotor 116 has an axial thickness of about 0.025 inch and a diameter of about 2.90 inches.

Figure 7:
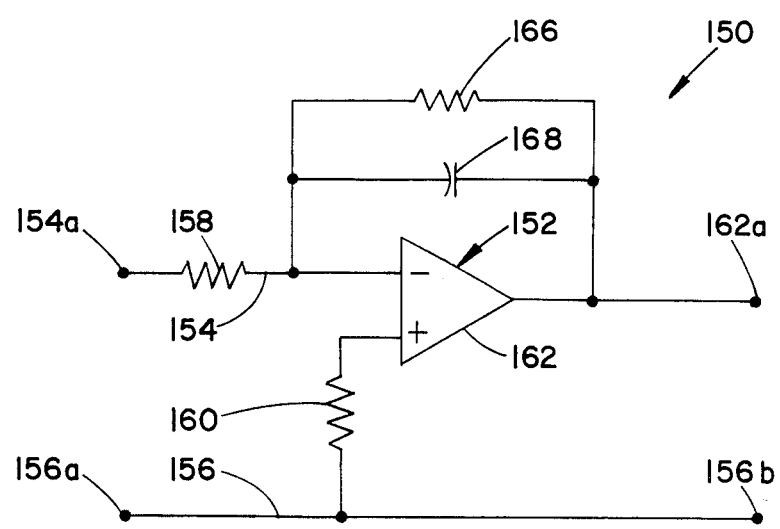

As mentioned hereinabove, the transducers or tachometer generators constructed as described herein require amplification of the output signal across the contact terminals of the brush units to obtain a signal which is practical for use. Any suitable amplifier circuit can be used for this purpose, such as the circuit 150 illustrated in FIG. 7 wherein a solid state amplifier 152 has an input side provided by line 154 and ground line 156, which lines have ends 154a and 156a respectively connectable across the contact terminals 84 in the embodiment of FIGS. 1-3 or the contact terminals 146 of the embodiment of FIGS. 3-6. Line 154 is connected to amplifier 152 through a resistor 158, and line 156 is connected to the input side of the amplifier through a resistor 160. Output from the amplifier is through a line 162 and ground line 156, the terminal ends 162a and 156b of which are connectable to a suitable signal indicating device, or the like. A feedback circuit is provided across the amplifier by means of parallel resistor and capacitor components 166 and 168, respectively. As further mentioned herein, transducers or tachometer generators constructed in accordance with the invention provide an output signal which, without amplification, is in the range of from about 6 to about 18 millivolts/1000 rpm. Amplification of such a millivolt signal to a magnitude of from about 15 volts to 10 volts, by an amplifier such as described above, will provide a usable signal.

While considerable emphasis has been placed herein on the specific structures of the signal generating devices illustrated and described, it will be appreciated that many changes can be made therein without departing from the principals of the present invention. Accordingly, it is to be distinctly understood that the foregoing descriptive matter is to be interpreted merely as illustrative of the invention and not as a limitation.

Having thus described the invention, it is claimed:

1. A unipolar direct current generator comprising a housing having an axis and axially opposite ends, an end wall closing each of said opposite ends, said housing and one of said end walls being of magnetic material and the other of said end walls being of non-magnetic material, a circular pole member of magnetic material within and coaxial with said housing, said pole member having a first end axially spaced from said one end wall and a second end axially spaced from said other end wall, a permanent magnet in the space between said one end wall and said first end of said pole member, said housing including an annular pole portion between said opposite ends thereof surrounding said pole member between said first and second ends thereof and providing an annular air gap therewith, a cup-shaped rotor of conductive material coaxial with said housing and having an annular side wall rotatable in said air gap, said rotor having a closed end adjacent said other end wall and an open end adjacent said first end of said pole member, a rotor drive shaft coaxial with said housing and extending through said other end wall, said shaft being rotatably supported by said other end wall and having an inner end fastened to said closed end of said rotor and a drivable outer end, first and second brush elements, and first and second brush holder means mounted on said housing and respectively supporting said first and second brush elements for radial engagement with said annular side wall of said rotor adjacent said closed and open ends thereof.

2. The current generator according to claim 1, wherein said permanent magnet has axially opposite planar faces adhesively bonded to the corresponding one of said one end wall and said first end of said pole member.

3. The current generator according to claim 1, wherein said housing includes annular wall portions extending axially inwardly from said opposite ends, and said pole portion of said housing extends radially inwardly from said annular wall portions.

4. The current generator according to claim 3, wherein said pole portion is integral with said annular wall portions.

5. The current generator according to claim 1, wherein said inner end of said rotor shaft is rotatably supported by said second end of said pole member.

6. The current generator according to claim 1, wherein said rotor drive shaft is of non-magnetic material.

7. The current generator according to claim 1, wherein said housing is of one-piece constructing including annular wall portions extending axially inwardly from said opposite ends, and said pole portion is integral with said annular wall portions and extends radially inwardly therefrom.

8. The current generator according to claim 7, wherein said pole portion of said housing is generally axially centrally between said opposite ends.

9. The current generator according to claim 8, wherein each said end wall is a generally flat plate member removably fastened to the annular wall portion at the corresponding one of said opposite ends of said housing.

10. The current generator according to claim 9, wherein said first end of said pole member includes a radially outwardly extending circumferential flange, and said permanent magnet is a circular member having a diameter corresponding to the diameter of said flange.

11. The current generator according to claim 10, wherein said inner end of said rotor drive shaft extends through said closed end of said rotor and has a terminal end axially inwardly adjacent said closed end, and means including an axially shallow bore in said second end of said pole member receiving and rotatably supporting said terminal end of said shaft.

12. The current generator according to claim 11, wherein said permanent magnet has axially opposite planar faces adhesively bonded to the corresponding one of said one end wall and said flange of said pole member.

13. The current generator according to claim 12, wherein said rotor drive shaft is of non-magnetic material.

14. A unipolar direct current generator comprising a housing of magnetic material having an axis, said housing including first and second end walls transverse to said axis and providing axially opposed planar inner surfaces, an annular permanent magnet on the inner surface of said first end wall and coaxial with said housing, said magnet having radially inner and outer ends and a planar side parallel to the inner surface of said second end wall and providing an air gap therewith, a planar rotor disc of conductive material in said air gap and having radially inner and outer portions respectively radially inwardly and radially outwardly of said radially inner and outer ends of said permanent magnet, a rotor disc drive shaft coaxial with said housing and extending through one of said end walls, said drive shaft being rotatably supported by said one end wall and having an inner end connected to said rotor disc and a drivable outer end, first and second brush elements, and first and second brush holder means mounted on said second end wall and respectively supporting said first and second brush elements for axial engagement with said rotor disc adjacent said radially inner and outer portions of said disc.

15. The current generator according to claim 14, wherein said first and second end walls of said housing are circular and said housing further includes an axially extending annular wall portion between said end walls and integral with one of said end walls.

16. The current generator according to claim 14, wherein said housing is circular and has an outer diameter and an axial length, said diameter being several times said length.

17. The current generator according to claim 14, wherein said inner end of said drive shaft extends through said rotor disc and has a terminal end within said housing and rotatably supported by the other of said end walls.

18. The current generator according to claim 14, wherein said first end wall has an axial thickness and said annular permanent magnet is a planar disc having an axial thickness less than that of said first end wall.

19. The current generator according to claim 14, wherein said annular permanent magnet is adhesively bonded to said inner surface of said first end wall.

20. The current generator according to claim 14, wherein said first and second end walls have an axial thickness and said axially opposed inner surfaces of said end walls are spaced apart a distance less than said axial thickness.

21. The current generator according to claim 20, wherein said inner surfaces of said end walls are axially spaced apart a distance less than the thickness of each said first and second end walls.

22. The current generator according to claim 20, wherein said annular permanent magnet is a planar disc having an axial thickness less than the thickness of each said first and second end wall.

23. The current generator according to claim 22, wherein said housing is circular and has an outer diameter and an axial length, said diameter being several times said length.

24. The current generator according to claim 23, wherein said inner end of said drive shaft extends through said rotor disc and has a terminal end within said housing and rotatably supported by the other of said end walls.

25. The current generator according to claim 24, wherein said annular permanent magnet is adhesively bonded to said inner surface of said first end wall.

26. The current generator according to claim 25, wherein said housing further includes an axially extending annular wall portion between said first and second end walls and integral with one of said end walls.

27. The current generator according to claim 26, wherein said inner surfaces of said end walls are axially spaced apart a distance less than the thickness of each said first and second end walls.

28. A unipolar direct current tachometer generator comprising a housing having an axis and axially opposite ends, an end wall closing each of said opposite ends, said housing and one of said end walls being of magnetic material and the other of said end walls being of non-magnetic material, a circular pole member of magnetic material within and coaxial with said housing, said pole member having a first end axially spaced from said one end wall and a second end axially spaced from said other end wall, a permanent magnet in the space between said one end wall and said first end of said pole member, said housing including an annular pole portion between said opposite ends thereof surrounding said pole member between said first and second ends thereof and providing an annular air gap therewith, a cup-shaped rotor of conductive material coaxial with said housing and having an annular side wall rotatable in said air gap, said rotor having a closed end adjacent said other end wall and an open end adjacent said first end of said pole member, a rotor drive shaft coaxial with said housing and extending through said other end wall, said shaft being rotatable and fastened to said rotor, output circuit means including means engaging said annular side wall of said rotor adjacent said open and closed ends thereof to provide a low voltage output signal in response to rotation of said rotor in said air gap, and said output circuit further including amplifier means to amplify said low voltage signal to a usable magnitude.

29. A unipolar direct current generator comprising a housing having an axis and axially opposite ends, an end wall closing each of said opposite ends, said housing and one of said end walls being of magnetic material and the other of said end walls being of non-magnetic material, a circular pole member of magnetic material within and coaxial with said housing, said pole member having a first end axially spaced from said one end wall and a second end axially spaced from said other end wall, a permanent magnet in the space between said one end wall and said first end of said pole member, said housing including an annular pole portion between said opposite ends thereof surrounding said pole member between said first and second ends thereof and providing an annular air gap therewith, a cup-shaped rotor of conductive material coaxial with said housing and having an annular side wall rotatable in said air gap, said rotor having a closed end adjacent said other end wall and an open end adjacent said first end of said pole member, a rotor drive shaft coaxial with said housing and extending through said other end wall, said shaft being rotatable and fastened to said rotor, first and second brush elements on said housing for radial engagement with said annular side wall of said rotor adjacent said closed and open ends thereof.

* * * * *